US 7,455,478 B2

(12) United States Patent
Matteucci

(10) Patent No.: US 7,455,478 B2
(45) Date of Patent: Nov. 25, 2008

(54) METHOD FOR CUTTING AND REMOVING UNDERWATER PIPELINES AND APPARATUS FOR IMPLEMENTING THE SAME

(76) Inventor: Francesco Matteucci, Via Gualco 4b, I-16165, Genoa (IT)

( * ) Notice: Subject to any disclaimer, the term of this patent is extended or adjusted under 35 U.S.C. 154(b) by 298 days.

(21) Appl. No.: 10/542,008

(22) PCT Filed: Feb. 6, 2004

(86) PCT No.: PCT/EP2004/001094

§ 371 (c)(1),
(2), (4) Date: Jul. 13, 2005

(87) PCT Pub. No.: WO2004/072529

PCT Pub. Date: Aug. 26, 2004

(65) Prior Publication Data

US 2006/0115331 A1    Jun. 1, 2006

(30) Foreign Application Priority Data

Feb. 12, 2003    (IT)    ............... GE2003A0011

(51) Int. Cl.
*F16L 1/16*    (2006.01)
(52) U.S. Cl. ............... 405/158; 405/156
(58) Field of Classification Search ............ 405/158, 405/173, 166, 168.3, 169–170, 154.1, 156
See application file for complete search history.

(56) References Cited

U.S. PATENT DOCUMENTS 4,443,129 A    4/1984    de Sivry et al.
4,444,528 A    4/1984    Scodino et al.
4,445,804 A *  5/1984    Abdallah et al. ............ 405/173
5,044,827 A    9/1991    Gray et al.
5,437,517 A    8/1995    Carrioli et al.

FOREIGN PATENT DOCUMENTS

GB    2 286 648    8/1995
WO    WO-02/075059    9/2002

* cited by examiner

*Primary Examiner*—Sunil Singh
(74) *Attorney, Agent, or Firm*—Stites & Harbison PLLC; Marvin Petry

(57)    ABSTRACT

A method is provided for cutting and removing underwater pipelines. The method comprises (a) determining the position of the underwater pipeline to be removed;(b) positioning, on the line a guide for positioning a cutter and a device for recovering the cut pipe sections, the guide being able to be repositioned along the line and being stably connected to a boat intended to collect the recovered sections; (c) guided positioning of the cutter and guided positioning of the device for recovering the cut pipe; (d) cutting of the pipe section of predetermined length and subsequent removal of the section by using the device for recovering the cut pipe; (e) transfer of the pipe section recovered by the recovery device to the boat; and (f) repositioning of the guide along the remaining line portion to be removed and repetition of the preceding steps(c) to(e) until the underwater pipeline has been completely removed. An apparatus for implementing this method is also provided.

18 Claims, 12 Drawing Sheets

METHOD FOR CUTTING AND REMOVING UNDERWATER PIPELINES AND APPARATUS FOR IMPLEMENTING THE SAME

FIELD OF THE INVENTION

The present invention relates to a method for cutting and removing underwater pipelines as well as to an apparatus for implementing this method.

BACKGROUND OF THE INVENTION

A huge number of oil or natural gas drilling rigs are currently being dismantled and this will result shortly in the need to remove numerous pipelines connecting these installations to dry land.

At present specific recovery systems are not envisaged and therefore the costs generally appear to be very high. In fact, the alternative solutions which hitherto may be taken into account envisage on the one hand the use of teams of underwater divers for cutting the pipes at depth and then the use of recovery means controlled from the surface on a special boat. This type of working method, which is not particularly recommendable owing to the increasing exposure of the underwater workers to risks, is time-consuming and involves decidedly high costs, attributable mainly to the use of numerous specialised workers who only occasionally work together as a team. With this method, in fact, it is possible to recover daily only a few sections of pipe each of about 24 meters length, with a relatively high cost per section.

Another possible solution for the removal of underwater pipelines involves the use of the same ships used to lay the pipes. These ships, which are highly specialised, are very limited in number and it is unlikely that they will be immediately available in the operations zones; this system, although it is much faster, since these ships are able to recover up to 100/200 sections per day, is nevertheless advantageous only in the case where pipelines of considerable length must be removed, since getting to the site and the daily cost of a pipe-laying ship involve particularly high costs.

The object of the present invention is therefore to provide a method for removing underwater pipelines which allows the dismantling of lines also of limited size at a reasonable cost. In order to achieve this type of result, it is necessary for the method to use a type of boat which is widely available and has a substantially small size compared to the operation performed, typically a supply vessel of about 60-70 meters length, and for cutting and removal of the underwater pipelines to be performed without the intervention of any underwater divers.

SUMMARY OF THE INVENTION

The present invention relates to a method for cutting and removing underwater pipelines, comprising the following steps:

a) determining the position of the underwater pipeline to be removed;

b) positioning, on the said line, guiding means for positioning cutting means and means for recovering the cut pipe sections, said guiding means being able to be repositioned along said line and being stably connected to a boat intended to collect the recovered sections;

c) guided positioning of the cutting means and guided positioning of the recovery means;

d) cutting of the pipe section of predetermined length and subsequent removal of said section by means of said recovery means;

e) controlled transfer of the pipe section recovered by said recovery means to said boat;

f) repositioning of the guiding means along the remaining line portion to be removed and repetition of the preceding steps c) to e) until the underwater pipeline has been completely removed.

The present invention also relates to an apparatus for implementing the method described above.

BRIEF DESCRIPTION OF THE DRAWINGS

Further advantages and characteristic features of the present invention will emerge clearly from the following detailed description of an embodiment provided by way of a non-limiting example with reference to the accompanying drawings, in which.

DETAIL DESCRIPTION

Figure 1:
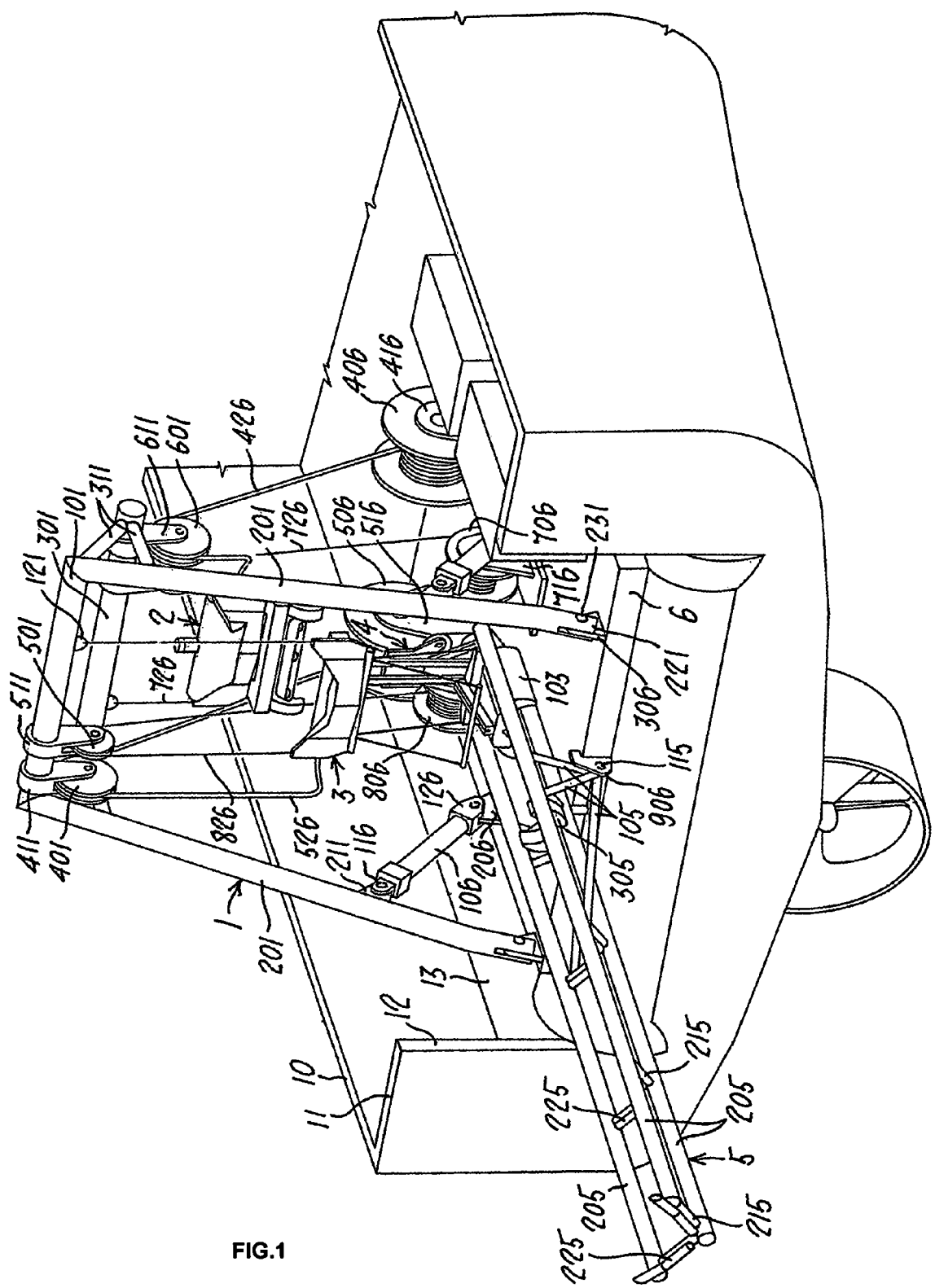
FIG. 1 is a perspective view of the apparatus for implementing the method according to the invention, mounted on a suitable boat.

FIG. 1 shows an axonometric view of an embodiment of the apparatus for implementing the method according to the present invention; 1 denotes a gantry comprising a cross member 101 and two uprights 201 able to be swung with respect to a support plate 6 which is stably connected to the deck 13 of a boat 10 and arranged opposite the opening 12 in the stern wall 11 of the said boat 10. The gantry 1 is connected to the said plate 6 by means of engagement, via the pins 231, of the fork members 221 at the ends of the uprights 201 with the ring-bolts 306 projecting from the plate 6. The two uprights 201 have, in the portion directed towards the plate 6, two radially projecting ring-bolts 211 which allow engagement with the ends 116 of the jacks 106 which at the opposite end 126 are hinged with the support ring-bolts 206 projecting from the plate 6. A beam 301, having substantially the same length as the cross member 101, is connected in a cantilever manner by the arms 311 to the gantry 1 in the vicinity of the cross member 101.

The two pulleys 401 and 501 are situated on the cross member 101 and are freely rotatable in the respective supports 411 and 511 which are keyed onto the said cross member 101; these supports may be both fixed and rotatable about the cross member. The pulley 501 deflects the cable 826 which supports the unit 3 for recovery of the pipe sections, to which the cutting unit 4 is connected. The cable 826 is supplied from the reel 806 arranged in its support 816 on the support plate 6, and one end thereof is fixed to the eyelet 121 of the cross member 101. Similarly the pulley 401 deflects the supply line 526—referred to below as umbilical cord 526— leading to the recovery unit 3 and cutting unit 4 and in turn supplied from the reel 506 arranged on the plate by means of the support 516. In the same way, the pulleys 601 and 701 are supported in a freely rotating manner on the cantilever beam 301 and respectively deflect the supply line 426—referred to below as umbilical cord 426—and the cable 726 for suspension of the guide unit 2; the line 426 is supplied from the reel 406 arranged on the plate 6 by means of the support 416 and the cable 726 is wound onto the reel 706 also arranged on the said plate by means of the support 716.

A swinging pipe-guiding arm 5 is arranged on the external edge of the plate 6 directed towards the opening 12 of the stem wall 11 of the boat 10, said arm being pivotably hinged by means of the pins 115 of a right-angled support frame 105 with the ring-bolts 906 projecting from the edge of said plate 6. The pipe-guiding arm 5 comprises three tubular elements 205 arranged substantially in a V shape and connected together by means of the cross-pieces 215; the guide rollers 225 for the recovered pipe sections are arranged on the said cross-pieces 215. The gripping jaws 305 are arranged close to the end of the pipe-guiding arm 5 directed towards the boat 10, on longitudinal sliding elements illustrated and described more fully below.

Figure 2:
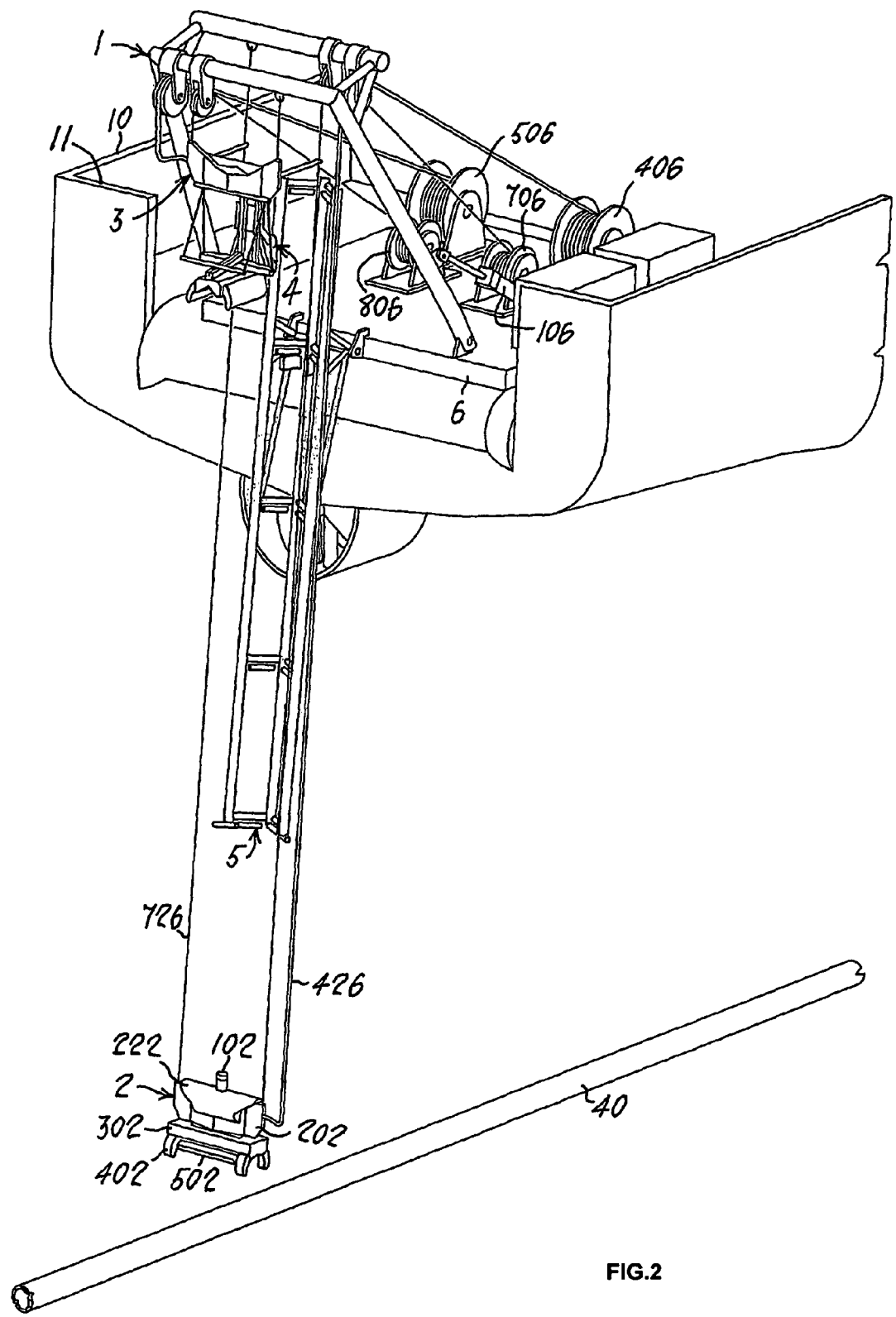
FIGS. 2 to 10 show schematic and perspective views of the sequence of operating steps of the method according to the present invention.

FIG. 2 shows a first operating step of the method according to the present invention; identical numbers have been used to indicate identical parts. The pipe-guiding arm 5 has been swung over, using suitable means, into a position substantially perpendicular to the floating plane of the boat 10; the gantry 1, as result of the action of the hydraulic jacks 106, now projects outside the stem wall 11 of the boat 10. The guide unit 2 has been lowered towards the underwater pipeline 40; the means 102 for determining the position of the pipeline 40 are arranged on top of the unit 2 and allow positioning of the guide unit 2 on the said line.

Figure 3:
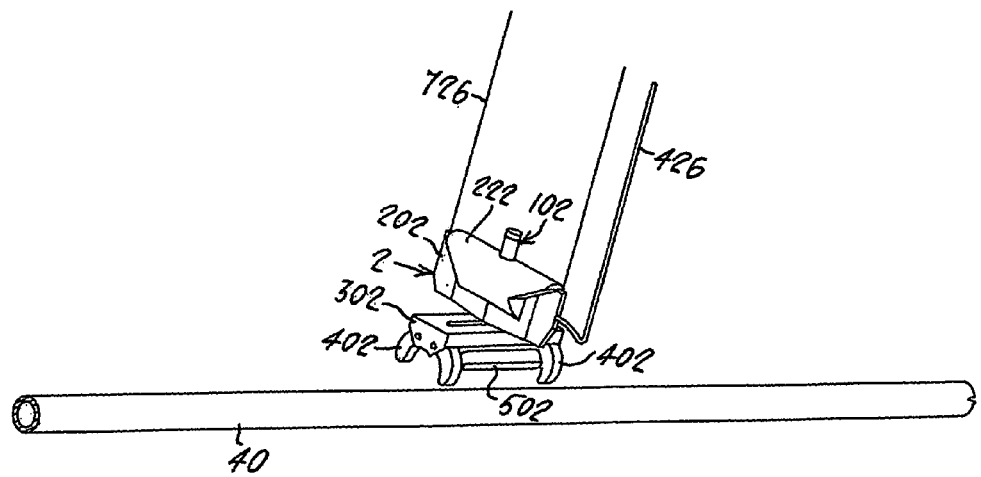
Figure 4:
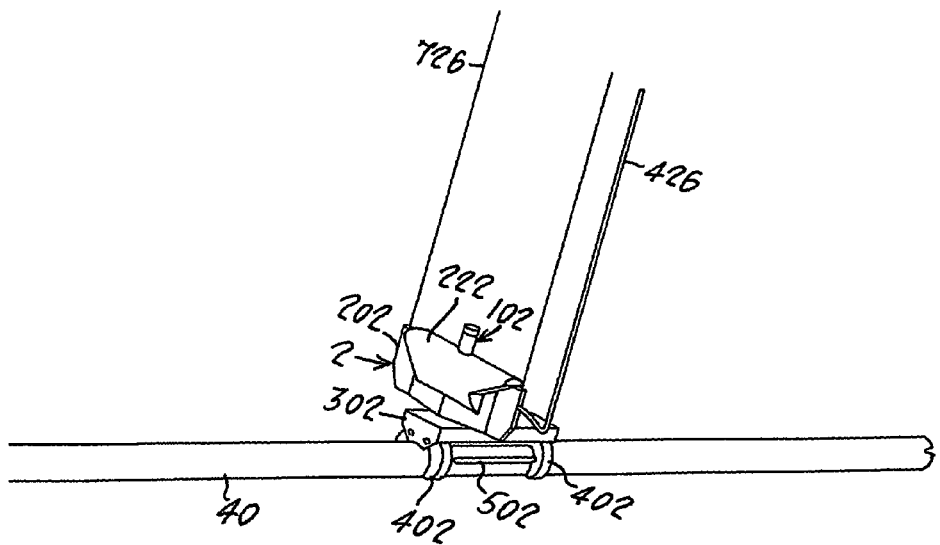

During the next step, shown in FIG. 3, the guide unit 2 is arranged immediately above the pipeline 40; the head-piece 202 of the guide unit 2 allows rotation of the support base 302, which is now arranged with the longitudinal axis parallel to the axis of the pipeline 40. In FIG. 4, the head-piece 202 of the guide unit 2, which is also movable along the longitudinal axis of the base 302, has moved to one of the said base 302, opposite to the free end of the pipeline 40. The jaws 402 situated at the two ends of the base 302 of the guide unit 2 have been clamped beforehand onto the said line 40; the base 302 of the guide unit is also provided with belts 502 which allow displacement thereof along the pipeline 40.

Figure 5:
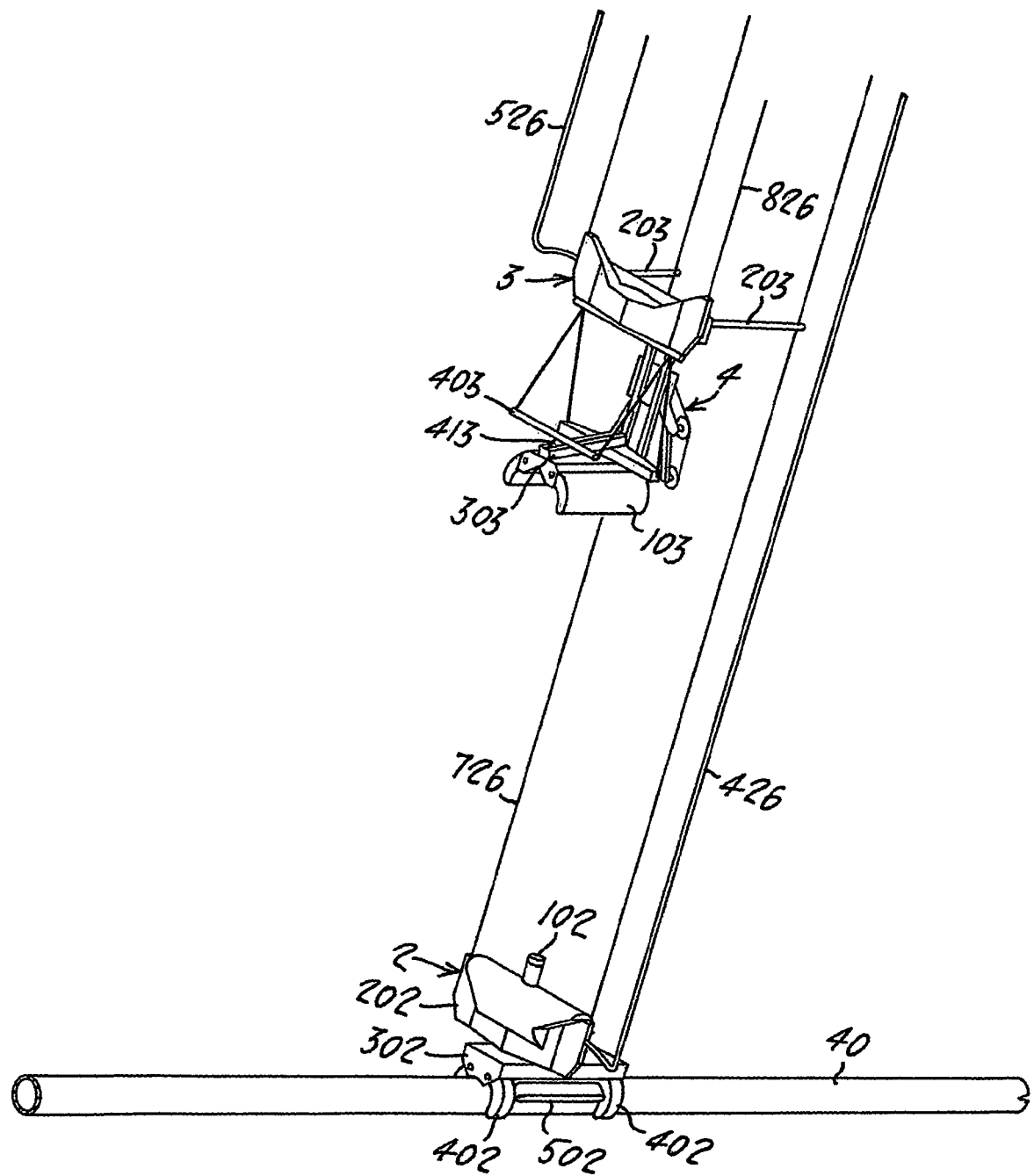

During the next step, shown in FIG. 5, the recovery unit 3 and cutting unit 4 connected thereto are now lowered along the cable 726 of the guide unit 2, by means of the arms 203 which project in a cantilever manner from the recovery unit 3 and at their free ends are able to engage in a sliding manner with said cable 726. The recovery unit 3 is provided in its bottom portion with a gripping clamp 103 for engagement with the pipe section to be recovered; a guide 303 is arranged on the clamp 103 and has, inserted therein, a slider 413 connected to a trapezium 403 which allows balancing of the recovery unit.

Figure 6:
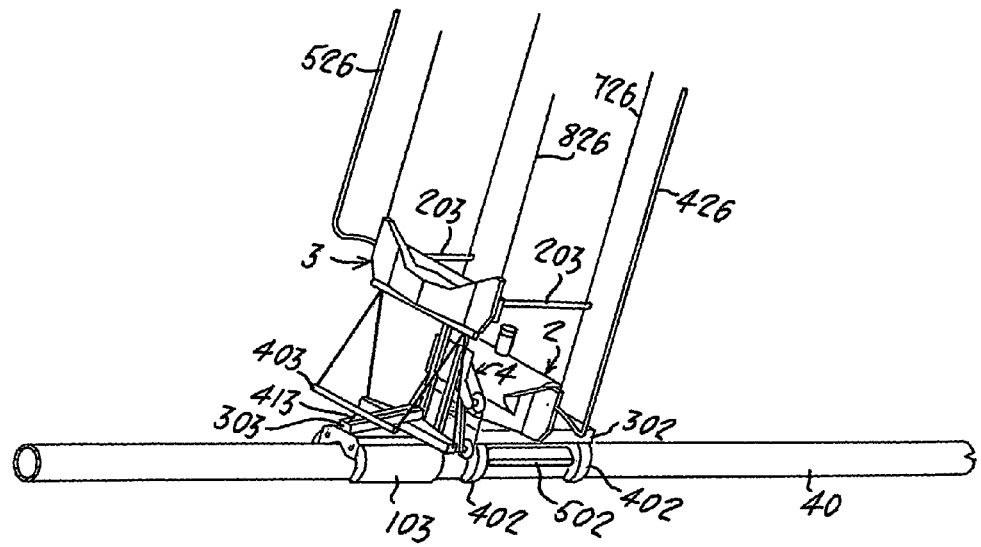
Figure 7:
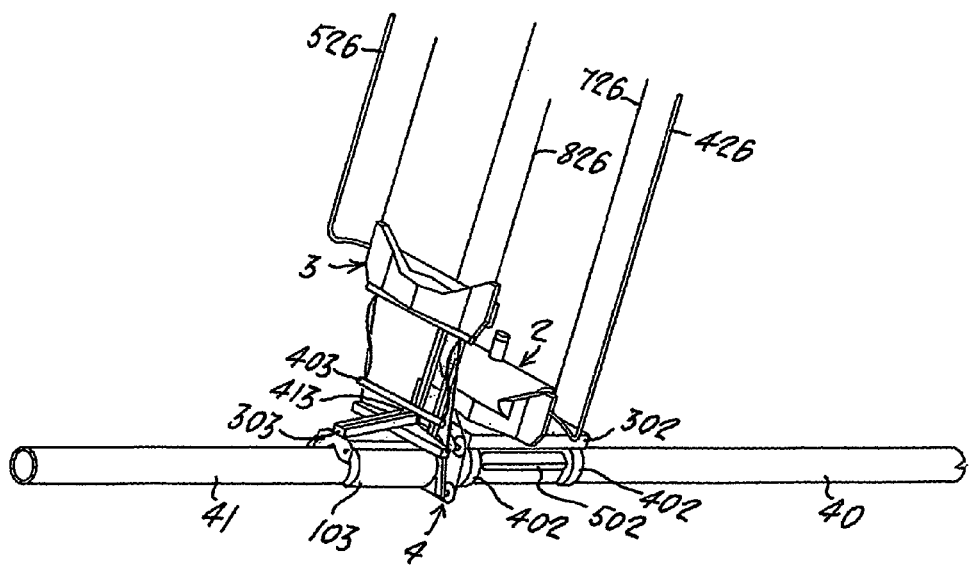
Figure 8:
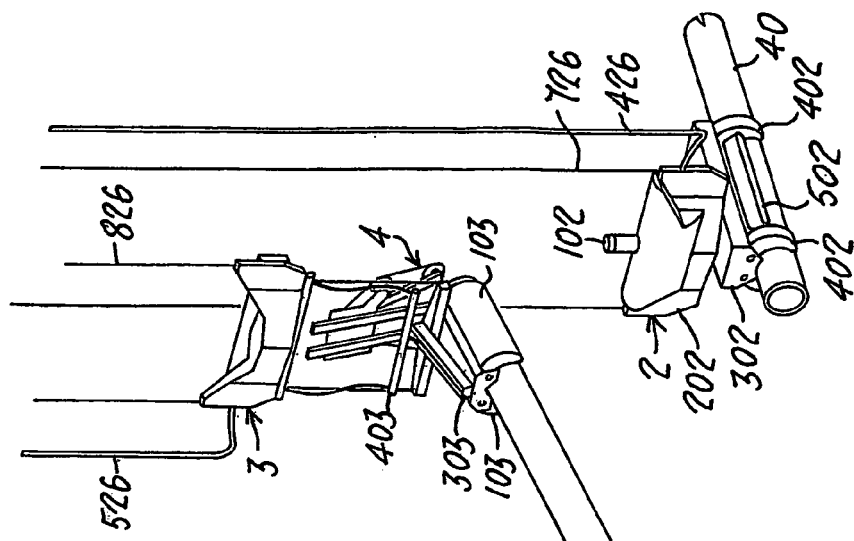

Then, as shown in FIG. 6, the gripping clamp of the recovery unit 3 is positioned on the line 40 and actuated so as to grip the pipe of the said line. During the next step, according to FIG. 7, the arms 203 are disengaged from the cable 726, the slider 413 of the trapezium 403 is displaced to the opposite end of the guide 303 so as to allow the pipe section 41 to be arranged in a vertical or near vertical condition, and the cutting unit 4 is actuated so as to section the pipeline 40. The pipe section 41 resulting from the cut performed during the step illustrated in FIG. 7 is at this point recovered (FIG. 8).

Figure 9:
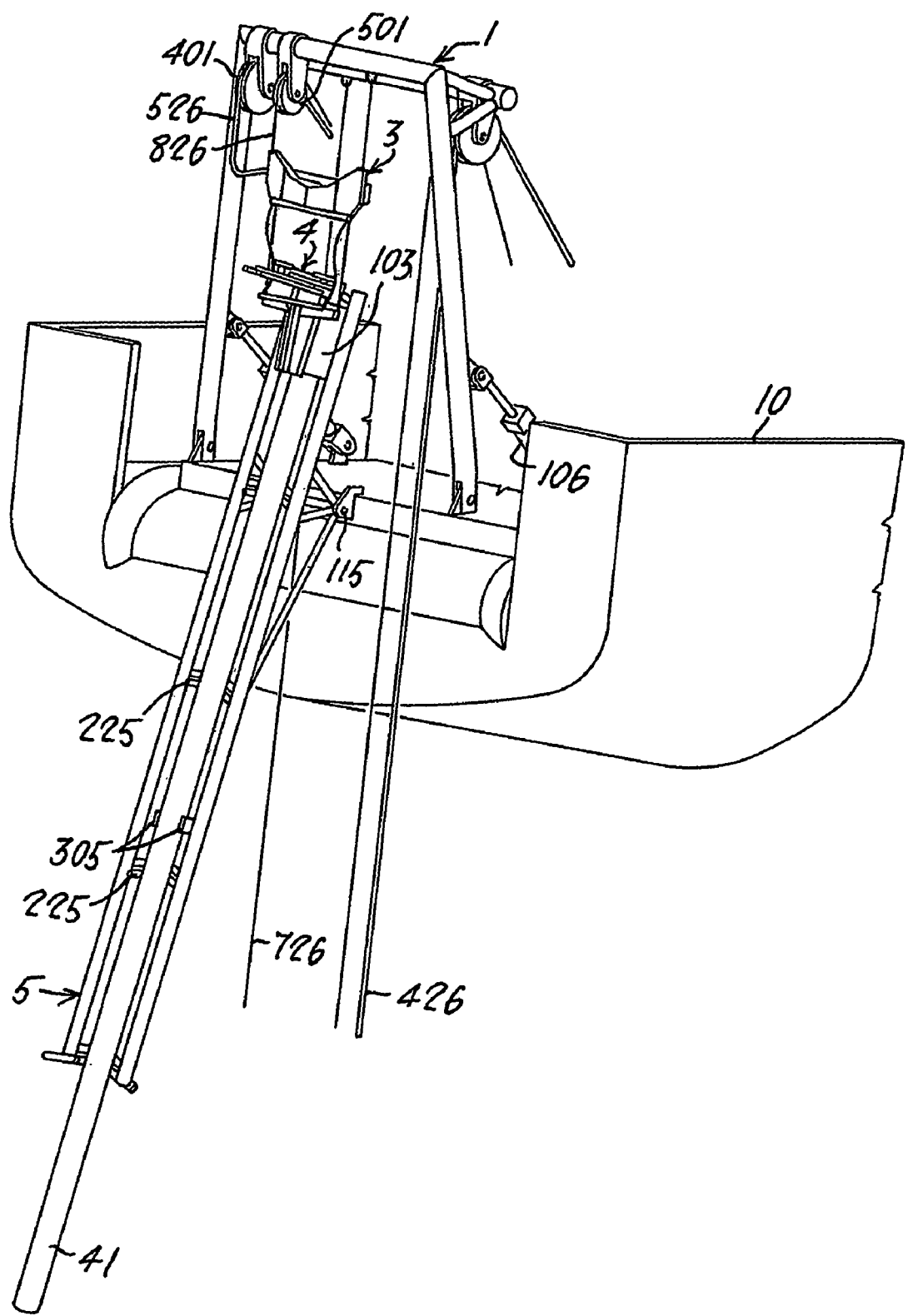
Figure 10:
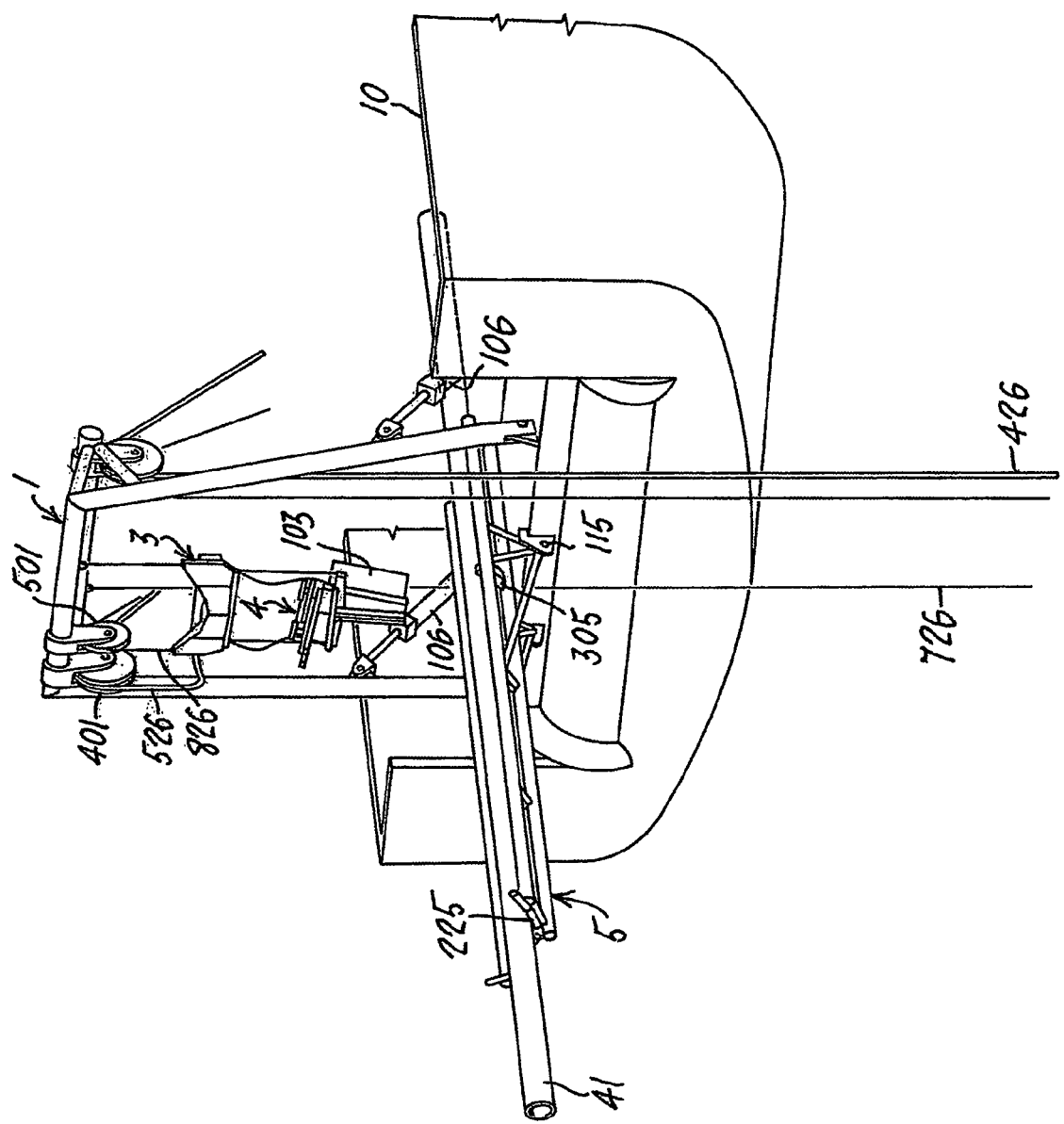

After returning to the surface, as shown in FIG. 9, the section 41 of the pipeline 40 is engaged with the pipe-guiding arm 5, where it is locked using the gripping means 305; the recovery unit 3 may at this point be disengaged from the section 41 (FIG. 10). The pipe-guiding arm 5 is swung over into a position substantially parallel to the deck of the boat 10 and therefore to the plate 6, while the recovered pipe section is moved a few meters upwards with the axial displacement of the gripping means 305 along the pipe-guiding arm; after disengagement of the gripping means 305, actuation of the rollers 225 on the pipe-guiding arm 5 will therefore allow the pipe section 41 to be loaded on-board.

The guide unit 2, not shown in FIG. 10, which has remained attached to the underwater line yet to be recovered, will be displaced along the said line 40, after release of the locking clamps 402, by means of operation of the belts 502, until it is positioned at the point where the next cut along the line 40 will be performed. In order to cut and recover a further pipe section, the pipe-guiding arm 5 will be lowered again and the recovery unit 3, together with the cutting unit 4 connected thereto, winched down again, after being connected again by means of the arms 203 to the cable 726 of the guide unit 2.

Figure 11:
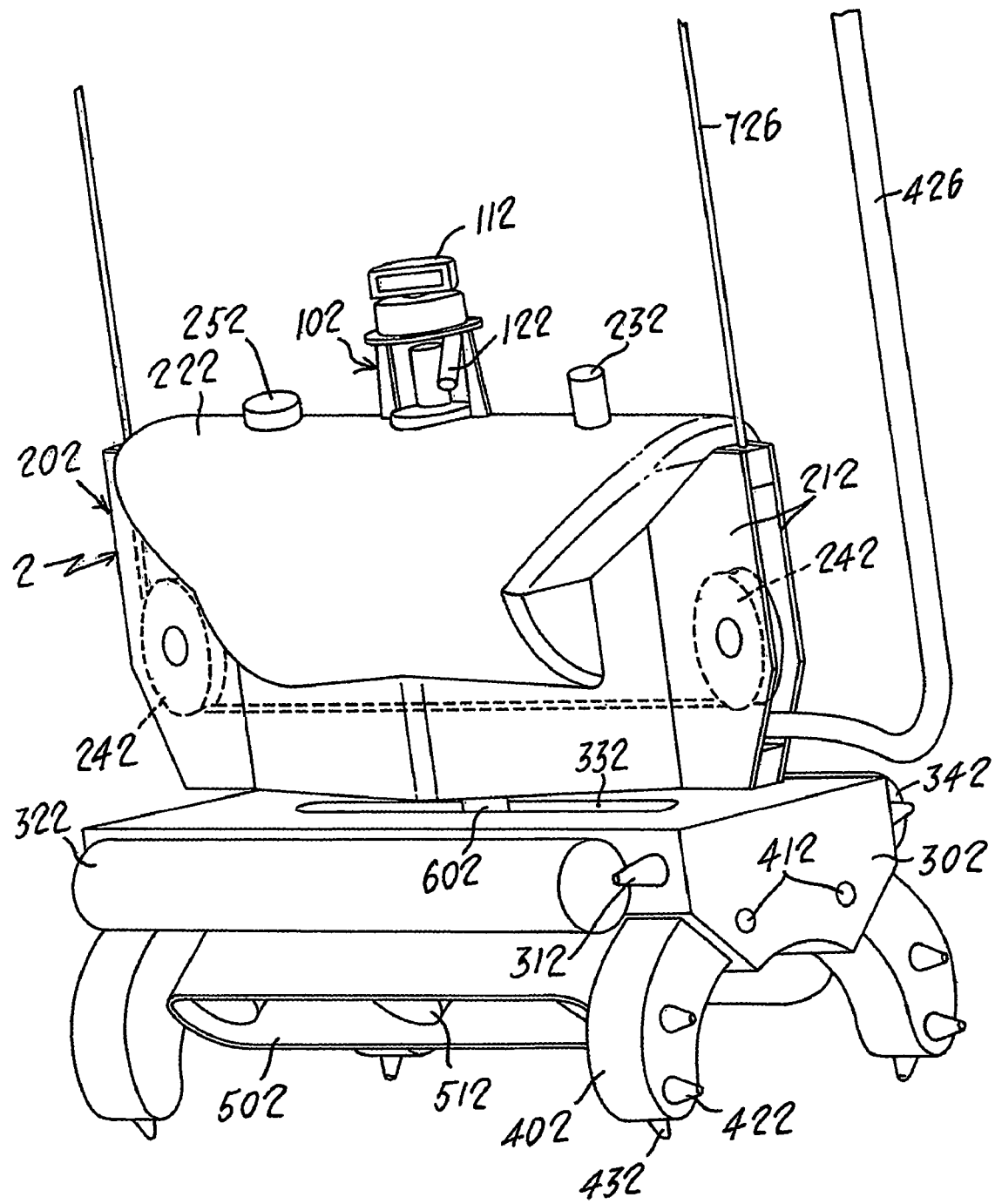
FIG. 11 shows a perspective view of a detail relating to the guiding means of the apparatus for implementing the method of the invention.

In the embodiment illustrated in FIGS. 2 to 10 described above, the method according to the invention is understood as being applied to an underwater pipeline which already has a free end. If, however, a first cut should have to be performed, so as to separate the pipeline from the structure to which it is connected, the steps performed according to the method of the invention will be substantially the same, except for the fact that, after the first cut, no recovery will be performed and the guiding means will be repositioned along the pipeline at the appropriate distance for producing a pipe section of the desired length, preferably of about 20 to 25 meters. FIG. 11 shows a perspective view of the guide unit 2 of the apparatus able to implement the method according to the invention.

As already described above, this unit 2 consists of a head-piece 202 comprising two facing metal plates 212 on top of which the floating body 222 is arranged; the cable 726 travels through the head-piece 202 via the pulleys 242, and the end of the umbilical supply cord 426 is inserted therein. The head-piece 202 is mounted on a shaft 602 which is arranged along the vertical axis of the said head-piece 202, rotatable through 180 degrees by means of an actuator housed again inside the said head-piece 202 and inserted in the movable support mounted in the slit 332 of the support base 302, as described more fully below. The means 102 for determining the position of the pipeline 40—in the specific case a sonar 112 and a videocamera 122 of the pan-and-tilt type—are positioned on top of the float 222. A compass 252 and an electronic detection element such as a beacon or transponder 232 are present on the sides of the means 102 for determining the position of the line 40.

The support base 302 of the guide unit 2 is provided at each of its ends with a pair of jaws 402 intended to grip the line 40, as illustrated in the figures described above, being pivotably hinged on the base 302 by means of the pins 412. Two motor-driven belts 502, which enable the displacement of the unit 2 along the line 40, are also envisaged, being arranged along its greater sides and acting in planes inclined at an angle of about 45 with respect to the plane of the said base 302. The side walls of the base have, positioned thereon, the nozzles 312 for ejection of water jets supplied from the pumping unit 322, said nozzles enabling displacement and rotation of the unit 2 in order to facilitate positioning thereof on the line 40. Similar nozzles 422 and 432, which are also connected to the pumping unit 322, are arranged on the jaws 402, respectively on the front walls and on the free end of the said jaws; these nozzles allow the removal from the line 40 of any sediment which could hinder the movement and clamping of the guide unit 2.

Figure 12:
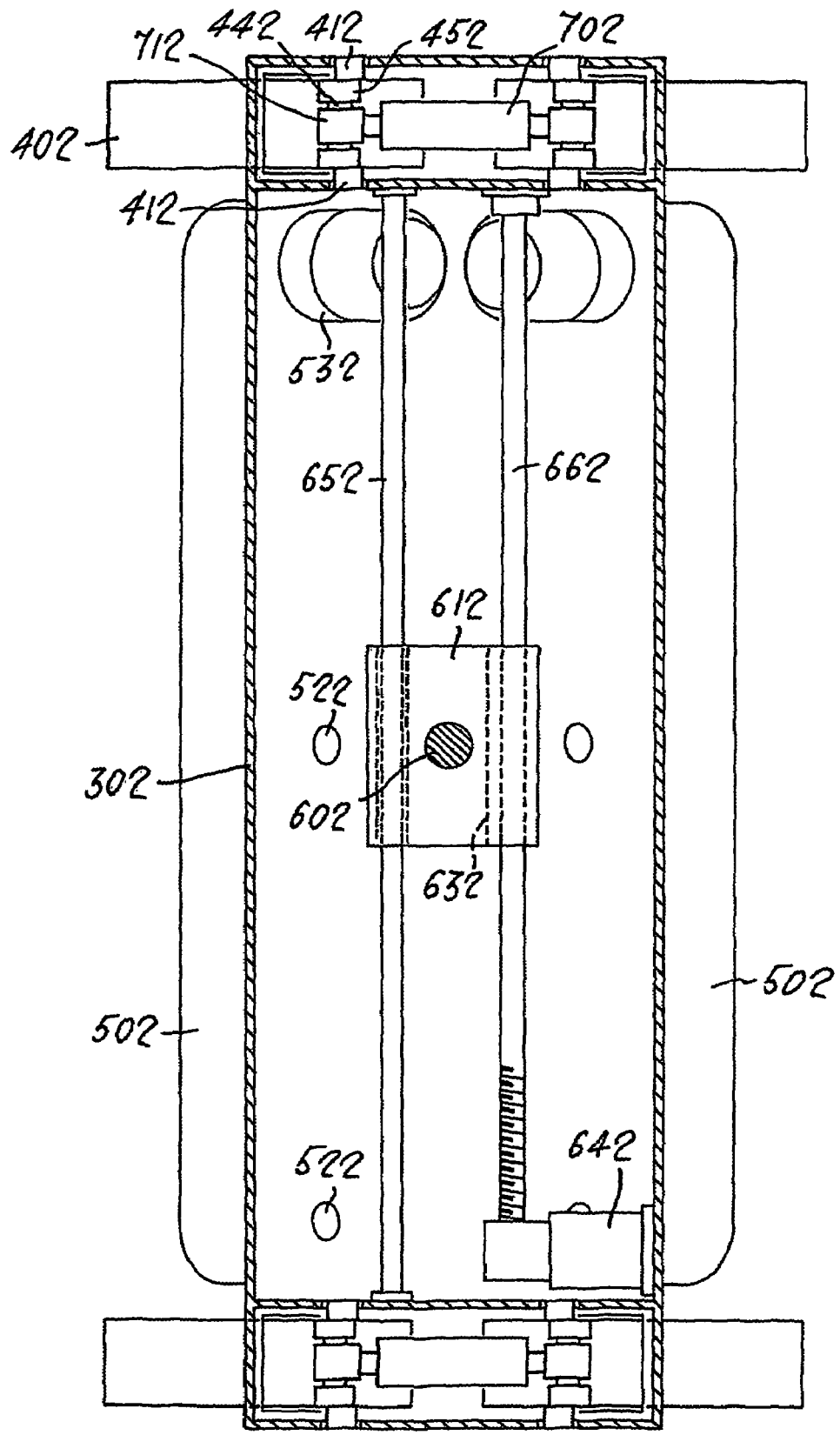
FIG. 12 shows a cross-sectional view along the line XII-XII in FIG. 11.

The cross-section in FIG. 12 shows the interior of the base 302 where the carriage 612, to which the shaft 602 mounted on the head-piece 202 is connected, is located. The carriage travels on two longitudinal guides 652 and 662; the guide 662 is a screw mating with a threaded bush 632 mounted inside said carriage 612 and connected at one end to a geared motor 642. In the Figure the axles 522 of the wheels 512 of the belts 502 are visible; the axles of the wheels 512 at one end of each belt 502 are coupled respectively to a motor 532. The jaws 402 are pivotably hinged on the base 302 by means of the pins 412 and each have, at the end directed towards said base, ring-bolts 452 which house the pin 442 co-operating with the stem 712 of the linear actuator 702 arranged between the said ends of the jaws 402.

Figure 13:
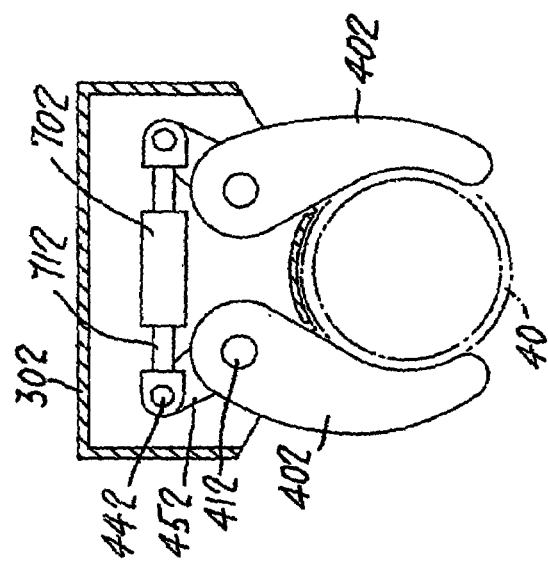
FIG. 13 shows a cross-sectional detail along the line XIII-XIII shown in FIG. 11.

FIG. 13 shows more clearly the system which allows opening and closing of the jaws 402 with respect to the pipeline 40. A linear actuator 702 is arranged inside the base 302, between the two jaws 402; the two pins 442 located in the ring-bolts 452 of the jaws 402 co-operate with the respective stem 712 of the actuator 702 and allow pivoting of the said jaws 402 with respect to the pins 412.

Figure 15:
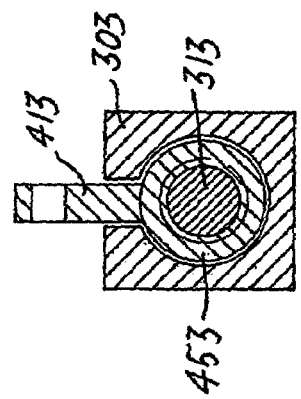
FIG. 15 is a cross-sectional view of a detail from FIG. 14.
Figure 14:
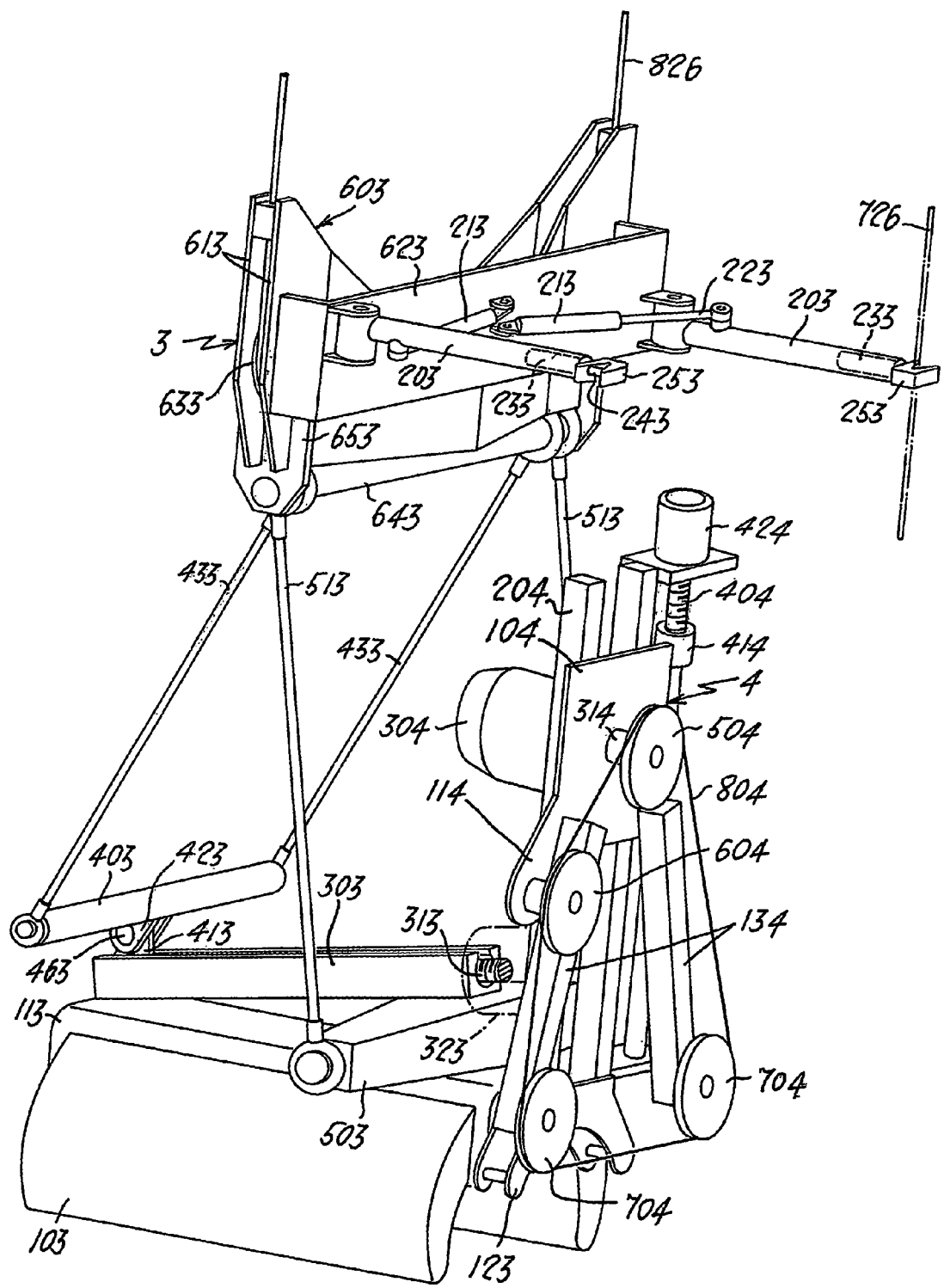
FIG. 14 shows a perspective view of the cutting means and means for recovering the underwater pipeline sections of the apparatus according to the invention.

FIG. 14 shows the recovery unit 3 with which the cutting unit 4 is associated. The recovery unit 3 comprises an upper frame 603 consisting of two metal sheets 613 inside which two pulleys 633 for driving the haulage cable 826 of the unit are housed. Two brackets 653 extend from the sheets 613 and have a cross member 643 inserted between them; a plate 623 is connected onto one of the sheets and has, hingeably mounted thereon, two projecting arms 203 which are coupled to two hydraulic jacks 213 which at one end are connected to the plate 623, while the stem 223 of each of the jacks 213 is connected to each of the arms 203. A hook member 253 is positioned at the free end of each of the arms 203 and is closed by a pin 243 which is coupled to an actuator 233 housed inside the arm 203. From the cross member 643 there extend the tie-rods 513 and 433 for supporting respectively the beam 503, associated with the box-shaped body 113 of the jaws 103, and the trapezium 403 which is in turn connected by means of the flanges 423 and the pin 463 to the slider 413 inserted inside the guide 303. The slider is coupled with the screw 313 provided with the motor 323 shown in dot-dash lines in the figure; as can be seen from FIG. 15, the slider 413 projects radially from a threaded bush 453 mating with the screw 313 and inserted in the guide 303.

The cutting unit 4 is integral with the box-shaped body 113 of the jaws 103, the guides 204 being fixed to the fork member 123 connected to this box-shaped body. The plate 104, from which the arms 134 extend, is slidably mounted on the guides 204. An idle pulley 704 for deflecting the diamond-coated cable 804 is arranged at the end of each arm 134; another deflection pulley 604 is located on the lug 114. The bush 414 coupled with the worm 404 provided with actuating means 424 is connected to the plate 104. The pulley 504 which is keyed onto the shaft 314 of the motor 304 is instead arranged in the centre of the plate 104.

Figure 16:
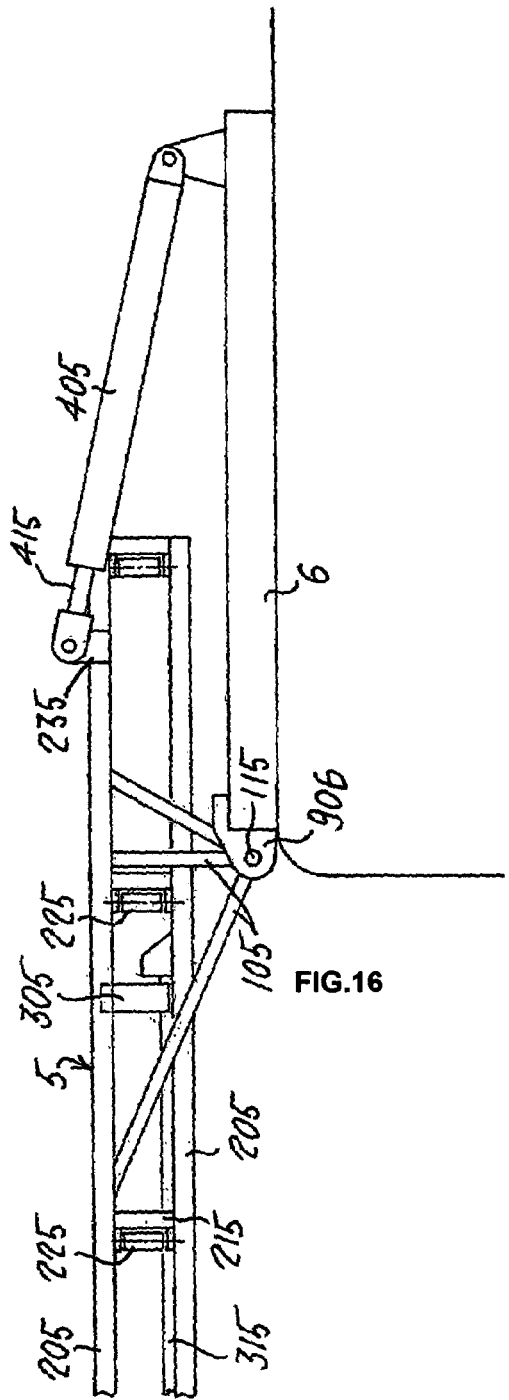
FIG. 16 is a schematic side elevation view of a detail according to FIG. 1.

FIG. 16 shows a side elevation view of a detail relating to the pipe-guiding arm 5 shown in FIG. 1. As can be seen, the pipe-guiding arm 5 is connected, close to its end directed towards the inside of the boat 10, to a hydraulic jack 405. The free end of the stem 415 of the jack 405 is coupled with the eyelet 235 located on the tubular element 205 of the arm 5; the opposite end of the jack 405 is instead connected pivotably to the plate 6 supporting the apparatus on the boat 10. The gripping means 305 are mounted movably on the guide 315 and provided with actuating means (not shown in the figure).

Figure 17:
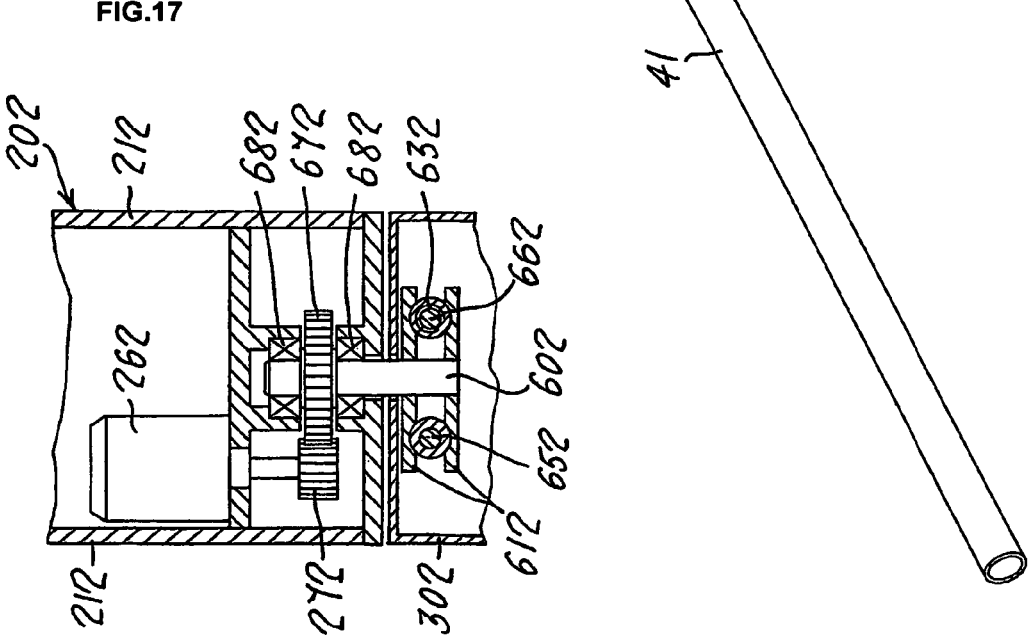
FIG. 17 is a cross-sectional view of a detail from FIG. 11.

Finally, FIG. 17 shows a cross-sectional detail relating to the head-piece 202 of the guide unit 2. The actuating means which allow rotation of the shaft 602 are arranged inside the two metal plates 212; a gearwheel 672 is keyed onto the said shaft and co-operates with the gearwheel 272 of a motor 262 located inside the head-piece 202. The rotation of the shaft 602 is guided by the sliding means 682. The shaft 602 is shown inserted in the carriage 612 inside which the female-thread bush 632 co-operating with the threaded guide 662 is arranged; in a symmetrical manner the guide 652 is also inserted slidably inside the carriage 612.

The operating principle of the apparatus designed to implement the method according to the present invention will appear clearly from the following account. As can be seen from FIG. 2 and FIG. 16, following operation of the jacks 106 which actuate the gantry 1 and the jacks 405 which allow positioning of the pipe-guiding arm 5 in the vertical position, the apparatus is in a condition to start operating. The guide unit 2 is lowered towards the seabed and then towards the pipeline 40. The cables 726 of the guide unit 2 and 826 of the recovery unit 3 are generally steel cables with a suitable cross-section; the cables 726 and 826 are kept constantly tensioned so as to compensate for the movements of the boat. The umbilical supply cords 426 and 526 have a suitable diameter such as to allow the conveying of power and various commands to the three units 2, 3 and 4 and have a tractional load capacity which is greater than the weight of the unit to which it is connected so as to allow emergency recovery thereof.

The guide unit 2 essentially performs two functions: determining the position of the line intended for removal and creation of guiding means which are stably connected between the said line and the boat. When it is in the situation shown in FIG. 2, the guide unit 2 is activated so as to perform its functions of determining the exact position of the line which, from on-board, can only be detected in an approximate manner. For this purpose the videocamera 122 and the sonar 112 are provided on the floating body 222; moreover, a compass 252 is positioned on the floating body 222 in a location such that it can be easily monitored by means of the videocamera 122. An electronic detection means 232 allows verification of the position of the boat with respect to the guide unit 2 and constant monitoring of the position of the pipeline 40. Furthermore, the videocamera 122 will be useful during the subsequent steps of the method for monitoring operation of the cutting unit 4. The floating body 222 arranged on the head-piece 202 has the function, owing to its considerable floating force, of keeping the guide unit 2 in a substantially constant vertical position.

The head-piece 202 is connected to the support base 302 of the guide unit 2 by means of the shaft 602, which is able to rotate, owing to the action of the motor 262 shown in FIG. 17, through 90° with respect to its vertical axis. The same shaft is arranged on the carriage 612 so as to be able to displace the head-piece 202 to the end of the support base directed towards the line section 40 to be cut. The guide unit 2, once the position of the pipeline 40 has been determined, is aligned with the said line using the water ejection nozzles 312, so as to allow both rotation and lateral displacements. A substantially different function is that performed by the nozzles 422 and 423 positioned on the jaws 402 and intended mainly to remove the sediment from the line so as to favour both improved clamping of the jaws 402 and easier travel of the belts 502 when the unit 2 is displaced along the line 40. These nozzles 312, 422 and 432 are supplied by the pumping unit 322 inside which a seawater pump is housed. The tank 342, which is positioned on the opposite side of the support base 302 of the unit 2, contains instead an oil pump with suitable actuating means (both not shown in the figures); the oil, which is supplied at a pressure of about 200 bars, provides the energy to the different functions inside the guide unit 2.

The jaws 402 grip the line 40 and their gripping action will obviously be firmer when the recovery unit 3 and cutting unit 4 are lowered, whereas during displacement of the unit 2 along the line 40 their grip will be slackened so as to allow the belts 502 to move the unit in the desired direction.

The recovery unit 3 and the cutting unit 4, which are integral with each other, are lowered, as shown in FIG. 5, along the cable 726 which acts as a guide for said units as far as the pipeline 40 intended for cutting and removal. The connection between the cable and the recovery unit 3 is provided by means of the arms projecting in cantilever fashion from the plate 623 of the upper frame 603 of said unit.

These arms 203 can be retracted by means of operation of the jacks 213 and connection thereof with the cable 726 may be engaged or disengaged by means of closing or opening of the hook member 253, which is obtained by means of operation of the respective actuator 233 of the pin 243. During its descent towards the pipeline 40, the clamp 103 is arranged parallel to the seabed; for this purpose the trapezium 403 is arranged at the end of the guide 303 opposite to that directed towards the cutting unit 4. Said trapezium may be displaced along the guide 303, owing to its connection to the slider 413 provided with a threaded bush 453 mating with the screw 313 contained inside said guide 303. In fact, if for positioning and gripping of the pipeline 40, the best arrangement of the jaws 103 is that parallel to the seabed, on the other hand recovery of the pipe section 41 is much easier if the latter can be arranged in a substantially vertical or near vertical manner with respect to the seabed; in this way, in fact, the water resistance is minimised and any deformation of the pipe section is avoided. It is therefore appropriate, before cutting and recovering the said pipe section 41, to perform displacement of the trapezium 403 in the manner described above. In these conditions, the jaws 103 will be connected to the upper frame 603 only by means of the tie-rods 513 of the cross-member 503 integral with the box-shaped body 113 of the said jaws 103; these tie-rods are freely pivotable with respect to the said cross member 503.

The jaws 103 of the recovery unit 3 may be operated in different ways and preferably operation thereof will be substantially similar to that described for the jaws 402 of the guide unit 2, described above and illustrated in FIGS. 12 and 13.

The cutting unit 4 commences operation when the jaws 103 are positioned clamped around the pipeline 40, as illustrated in FIGS. 6 and 7. The endlessly wound diamond-coated cable 804 is mounted on the pulleys 504, 604 and 704; the two pulleys 704 are positioned on the two support arms 134 which are arranged so as to allow easily cutting of the line 40, while the pulley 504 is motor-driven and transmits the movement to the cable 804. The support plate 104 is conveyed along the guides 204 to which it is connected, by means of the action of the bush 414 connected to the said plate 104 and coupled with the worm 404 provided with actuating means 424.

Once cutting has been finished, the plate 104 is brought back into the position shown in FIG. 14 and the pipe section 41, which is gripped by the jaws 103, may be recovered.

In the embodiment shown and described above, the cutting unit 4 and the recovery unit 3 are integral with each other; however, this cutting unit need not be necessarily recovered after each cut which is performed, since its function in the method according to the invention is performed on the line 40 in the vicinity of the seabed. From this point of view, the cutting unit could also be associated with the guide unit 2, even though it could be preferable to be able to recover the cutting unit without disengaging the guide unit from the line, for example in order to carry out maintenance of the said unit during work on or replacement of the diamond-coated cable. The cutting unit could therefore be completely independent and also be lowered along the cable 726 of the said guide unit 2.

The invention claimed is:

1. A method for cutting and removing an underwater pipeline, the method comprising the following steps:
    a) determining the position of the underwater pipeline to be removed;
    b) positioning, on the pipeline, guiding means for positioning cutting means and recovery means for recovering the cut pipe sections, said guiding means being able to be repositioned along said pipeline and being stably connected to a boat intended to collect recovered sections of cut pipe;
    c) guided positioning of the cutting means and guided positioning of the recovery means;
    d) cutting a pipe section of predetermined length;
    e) removing the pipe section using said recovery means;
    f) transferring the pipe section to said boat;
    g) repositioning the guiding means along a remaining pipeline portion to be removed and repeating steps c) to f) until the underwater pipeline has been completely removed.

2. An apparatus for implementing the method for cutting and removing underwater pipelines according to claim 1, said apparatus comprising:
    cutting means for cutting said underwater pipelines;
    recovery means for recovering the cut sections of the, said cutting means and said recovery means are connected;
    guiding means for positioning said cutting means and said recovery means;
    suspension means for suspending said guiding means, cutting means and recovery means, said suspension means comprises a gantry comprising two uprights and a cross member to which hoisting means for lowering and hoisting on-board said boat said guiding means; and
    transferring means for transferring the recovered pipe sections to the loading compartment of a boat, said transferring means being located on a suitable support comprising a plate arranged on a deck of said boat opposite an opening formed in a stern wall thereof,
    wherein said gantry being arranged on said support plate along an external edge directed towards said opening formed in the stern wall.

3. The apparatus according to claim 2 wherein said uprights of said gantry are pivotably hinged with said support plate and provided with actuating means which allow positioning of said gantry in a substantially cantilever manner with respect to the stern wall of said boat.

4. The apparatus according to claim 2 wherein said gantry, in a vicinity of the cross member, has connected thereto, in cantilever fashion, by means of arms, a beam which is parallel to and has substantially the same length as the cross member.

5. The apparatus according to claim 4, wherein deflection pulleys for cables for suspension of the guiding means, recovery means and cutting means are arranged on the said cross member and on the beam.

6. An apparatus for implementing the method for cutting and removing underwater pipelines according to claim 1, said apparatus comprising:
   cutting means for cutting said underwater pipelines;
   recovery means for recovering the cut sections of the pipeline;
   guiding means for positioning said cutting means and said recovery means, said guiding means comprising a guide unit comprising:
   a support base provided with gripping means for gripping said underwater pipeline,
   movement means for moving said support base along said pipeline, and
   a head-piece mounted on a shaft rotating on said support base, said head-piece being provided thereon with deflecting means for deflecting a cable for connection with said suspension means, a floating body and detecting means for detecting the position of said underwater pipeline;
   suspension means for suspending said guiding means, cutting means and recovery means; and
   transferring means for transferring the recovered pipe sections to the loading compartment of a boat, said transferring means being located on a suitable support comprising a plate arranged on a deck of said boat opposite an opening formed in a stern wall thereof.

7. The apparatus according to claim 6, wherein said detecting means comprises at least one videocamera and a sonar.

8. The apparatus according to claim 7, wherein said head-piece is provided thereon with a compass arranged in the visual field of the videocamera.

9. The apparatus according to claim 6, wherein said shaft is located on a carriage movable in the direction of the length of said support base so as to position said head-piece at one of the two ends of said support base.

10. The apparatus according to claim 6, wherein said support base is provided, along its perimetral edges, with a plurality of nozzles oriented perpendicularly with respect to the plane of travel of the cable for suspending said guide unit and able to eject pressurised fluid supplied by suitable means.

11. The apparatus according to claim 6, wherein said gripping means comprises jaws provided with suitable actuating means arranged in said support base.

12. The apparatus according to claim 6, in which said movement means comprises elements suitable for displacement arranged along the sides of said support base with a mutual inclination preferably of 90°.

13. An apparatus for implementing the method for cutting and removing underwater pipelines according to claim 1, said apparatus comprising:
   cutting means for cutting said underwater pipelines;
   recovery means for recovering the cut sections of the pipeline, said recovery means comprising a recovery unit comprising gripping means provided with a substantially rectangular box-shaped body, said box-shaped body being connected to an upper frame in which deflecting means for deflecting a cable connected to said suspension means by means of the tie-rods are arranged;
   guiding means for positioning said cuffing means and said recovery means;
   suspension means for suspending said guiding means, cuffing means and recovery means; and
   transferring means for transferring the recovered pipe sections to the loading compartment of a boat, said transferring means being located on a suitable support comprising a plate arranged on a deck of said boat opposite an opening formed in a stern wall thereof.

14. The apparatus according to claim 13, wherein said box-shaped body has arranged at one end, a beam stably connected to said box-shaped body at the ends of which two of the said tie-rods are connected, and there being arranged longitudinally with respect to said box-shaped body, a guide in which a slider is movable, said slider being associated with a trapezium perpendicular to said guide at the ends of which two more of the said tie-rods are connected.

15. The apparatus according to claim 13, wherein said upper frame is provided with two cantilever arms arranged perpendicular to the plane of travel of the cable for suspension of the recovery unit, provided with retraction means and provided at their free end with means for engagement with said guide means, which are releasable.

16. An apparatus for implementing the method for cutting and removing underwater pipelines according to claim 1, said apparatus comprising:
   cutting means for cutting said underwater pipelines, said cutting means comprising a cutting unit;
   recovery means for recovering the cut sections of the pipeline;
   guiding means for positioning said cutting means and said recovery means, wherein said cutting unit is integrally mounted with said recovery means;
   suspension means for suspending said guiding means, cutting means and recovery means; and
   transferring means for transferring the recovered pipe sections to the loading compartment of a boat, said transferring means being located on a suitable support comprising a plate arranged on a deck of said boat opposite an opening formed in a stern wall thereof.

17. An apparatus for implementing the method for cutting and removing underwater pipelines according to claim 1, said apparatus comprising:
   cutting means for cutting said underwater pipelines;
   recovery means for recovering the cut sections of the pipeline;
   guiding means for positioning said cutting means and said recovery means:
   suspension means for suspending said guiding means, cutting means and recovery means; and
   transferring means for transferring the recovered pipe sections to the loading compartment of a boat, said transferring means being located on a suitable support comprising a plate arranged on a deck of said boat opposite an opening formed in a stern wall thereof, said transferring means for transferring the recovered pipe sections comprising a pipe-guiding arm hinged with an external edge of the support plate directed towards the opening in the stern wall of the boat and provided with actuating means for moving the pipe-guiding arm from a position substantially perpendicular to the deck of the boat to a substantially parallel position and provided with means for gripping the recovered pipe section and means for slidably guiding said section.

18. An apparatus for implementing the method for cutting and removing underwater pipelines according to claim 1, said apparatus comprising:
   cutting means for cutting said underwater pipelines, said cutting
   means comprising an endlessly wound diamond-coated cable deflected around a plurality of pulleys, at least one of which is motor-driven and which are arranged so as to define a cutting plane perpendicular to the underwater pipeline, said pulleys being connected to a plate mounted slidably on at least one guide and associated with actuating means for moving said plate towards and away from said underwater line;
recovery means for recovering the cut sections of the pipeline;
guiding means for positioning said cutting means and said recovery means;
suspension means for suspending said guiding means, cutting means and recovery means; and
transferring means for transferring the recovered pipe sections to the loading compartment of a boat, said transferring means being located on a suitable support comprising a plate arranged on a deck of said boat opposite an opening formed in a stern wall thereof.

* * * * *